United States Patent [19]

Koshoffer et al.

[11] Patent Number: 4,686,826
[45] Date of Patent: Aug. 18, 1987

[54] MIXED FLOW AUGMENTOR INCORPORATING A FUEL/AIR TUBE

[75] Inventors: John M. Koshoffer; Richard A. Pfefferle; Harold A. Larson, all of Cincinnati, Ohio

[73] Assignee: The United States of America as represented by the Secretary of the Air Force, Washington, D.C.

[21] Appl. No.: 149,792

[22] Filed: May 14, 1980

[51] Int. Cl.$^4$ .......................... F02K 3/10; F02K 3/04
[52] U.S. Cl. ........................................ 60/261; 60/262
[58] Field of Search .................. 60/737, 749, 261, 262

[56] References Cited

U.S. PATENT DOCUMENTS

| | | | |
|---|---|---|---|
| 2,823,519 | 2/1958 | Spalding | 60/749 |
| 2,934,895 | 5/1960 | Gregory | 60/261 |
| 3,009,317 | 11/1961 | Meyer | 60/261 |
| 3,245,218 | 4/1966 | Marchant | 60/749 |
| 3,540,216 | 11/1970 | Quillevere | 60/261 |
| 3,620,012 | 11/1971 | Wilde | 60/749 |
| 4,134,260 | 1/1979 | Lefebvre | 60/261 |
| 4,299,600 | 11/1981 | Kobashi | 60/311 |
| 4,335,573 | 6/1982 | Wright | 60/262 |

*Primary Examiner*—Stephen C. Bentley
*Attorney, Agent, or Firm*—Bobby D. Scearce; Donald J. Singer

[57] ABSTRACT

In a turbofan jet engine, having a circumferentially rotatable mixer segment capable of orienting the afterburner ignitors and flameholders into the path of either the exhaust gases or bypass air, a fuel-air transfer apparatus for capturing, transporting and the releasing of an enriched fuel-air concentration from the fuel spray bars, on the stationary structure of the jet engine, to the afterburner ignitors and flameholders rigidly attached at the rear of the rotatable segment of the mixer. The enriched fuel-air mixture is transported between a location of reliable fuel availability, through a region of highly turbulent gas flow and is thereafter released while still in an enriched concentration immediately upstream of the ignitors and flameholders, facilitating ignition and sustained operation of the afterburner. The transfer of the fuel-air mixture with the exhaust gases in a confining apparatus precludes the necessity for transferring fuel, by flexible attachment or other means, between the stationary jet engine structure and the rotatable segment of the mixer, upon which the ignitors and flameholders are mounted, while insuring an appropriate fuel-air mixture for ignition and operation of the afterburner.

2 Claims, 6 Drawing Figures

MIXED FLOW AUGMENTOR INCORPORATING A FUEL/AIR TUBE

RIGHTS OF THE GOVERNMENT

The invention described herein may be manufactured and used by or for the Government of the United States for all governmental purposes without the payment of any royalty.

BRIEF SUMMARY

According to this invention a fuel-air transfer tube is interposed between the fuel spray bars, affixed to the stationary structure of a turbofan jet engine, and the flameholders and ignitors attached to the rear of a circumferentially rotatable segment of the mixer. Fuel introduced by the spray bars is captured by the transfer tube while in an enriched fuel-air concentration, immediately downstream of the spray bars, confined within the tube while traversing a turbulent gas flow region within the rotatable mixture, and thereafter, released immediately upstream of the flameholders and ignitors. Afterburner light-off and blow-out performance is thereby maintained in a rotatable mixer engine configuration without introducing the reliability problems associated with a movable or translatable fuel line, and without the potential of creating a light-off initiated turbofan stall.

DETAILED DESCRIPTION

The invention taught herein relates to military type turbofan jet engines with afterburners, in which the turbofan driven bypass gases are mixed with exhaust gases to enhance thrust and reduce the temperature of the gas mixture discharged from the jet engine. More specifically, the invention addresses itself to a fuel transfer problem within a jet engine of the general type described above but modified to have the rearward segment of the mixer circumferentially rotatable, a unique structural configuration known as a "switched mixer".

Circumferentially rotatable mixers are used to suppress infrared energy emanating from the rear of such jet engines. The engines employ conventional mixer configurations, with multiple, radially separated troughs alternately passing exhaust gases and bypass air. However, the afterburner flameholders cover only alternate troughs and are attached to the rear of a rotatable segment of the mixer structure. Such a configuration permits the flameholders to be aligned with the trough converging exhaust gases during afterburner operation, while retaining the ability to reduce heating and effectively suppress infrared emissions from the flameholders by subsequently rotating them into an adjacent trough of cool bypass air. In the latter described configuration, direct thermal radiation from the turbine blades of the engine is prevente by curvilinearly canting the troughs in a manner to be described with specificity hereinafter.

Inclusion of a rotatable mixer into a turbofan jet engine creates a variety of design problems relating to the ignition and sustained operation of the afterburner. In a conventional military jet engine having a stationary mixer the afterburner fuel spray bars are located immediately upstream of the "V" gutter type flameholders. Since the ignitors for the afterburner are disposed proximate to the flameholders, fuel introduced into the exhaust gas stream reaches the flameholders and ignitors in an enriched fuel-air concentration, facilitating both ignition and sustained burning. With the added complexity of a rotating mixer segment, structural constraints hinder the placement of the flameholder and ignitor apparatus in close proximity to the fuel spray bars. The spray bars are now positioned on the rearward edge of the fixed segment of the mixer, while the flameholders, by nature of their design, must be attached at the rear of the rotatable segment of the mixer.

Ignition of the afterburner, and continuity of its burning, is constrained by richness limits on the fuel-air ratio. As the separation between the fuel spray bars and flameholders apparatus is increased, the turbulent gas flow within the structure dilutes the fuel-air mixture as the mixture travels rearward toward the flameholders and ignitors. Increasing the rate at which fuel is being introduced by the spray bars corrects the diffusion problem; however, it creates a significant risk of inducing turbofan stall. Likelihood of stall occurs when the larger volume of fuel is ignited, due to the elevated light-off temperature and pressure transient reflected upstream. Another consideration militating against the distant location of the fuel spray bars from the flameholder assembly is the deleterious effect on the blow-out characteristics of the afterburner. As with ignition, the magnitude of fuel introduced must be increased to maintain appropriate fuel-air concentrations at the flameholders during afterburner operation. Insufficient fuel causes afterburner blow-out, while elevated flow rates consume aircraft fuel at an unnecessarily high rate, a definite detraction for military aircraft engines.

Relocating the fuel spray bars from their upstream position on the stationary engine structure to a position on the rotatable mixer, into the region immediately upstream of the flameholders and ignitors, precludes the stall problem described above. Unfortunately, such a location while apparently solving one problem creates another; the latter being one of reliability. The vibration and temperature environment appearing in the rotatable mixer and afterburner region of the jet engine prevents reliable use of flexible or otherwise translateable fuel lines between the stationary engine structure and spray bars attached to the rotating mixer.

A number of fundamental design constraints drive and limit the designers flexibility in the course of configuring a structure for providing an appropriate fuel-air ratio at the flameholders. The structure selected must be mechanically reliable, capable of performing in a region of highly turbulent and distorted gas flow, fairly insensitive to flow velocity, capable of transporting either raw fuel or an enriched fuel-air mixture in an environment of hot flowing gases without ignition of the fuel, configured and located within the engine structure such that the burning activity at the flameholder never moves upstream along or through it, and finally, the apparatus and its configuration within the engine structure must not be within the path of the hot exhaust gases when the flameholder segment of the mixer has been rotated to the infrared suppression orientation. Realization of these often divergent goals with the fewest changes in the established jet engine design was manifest to be the most viable approach.

It should be noted, at the onset, that the majority of the ensuing description and the drawings referenced therein do not depict or describe the canted characteristics of the actual jet engine mixer structure. This is due to the extreme difficulty of portraying and describing the refinement in the course of presenting the invention. Though the invention is distinct from this structural refinement, the benefits of the complete system are intertwined in all the elements of the overall engine design. For that reason, the canting of the mixer troughs and infrared radiation suppression produced will be fully described separately.

Figure 1:
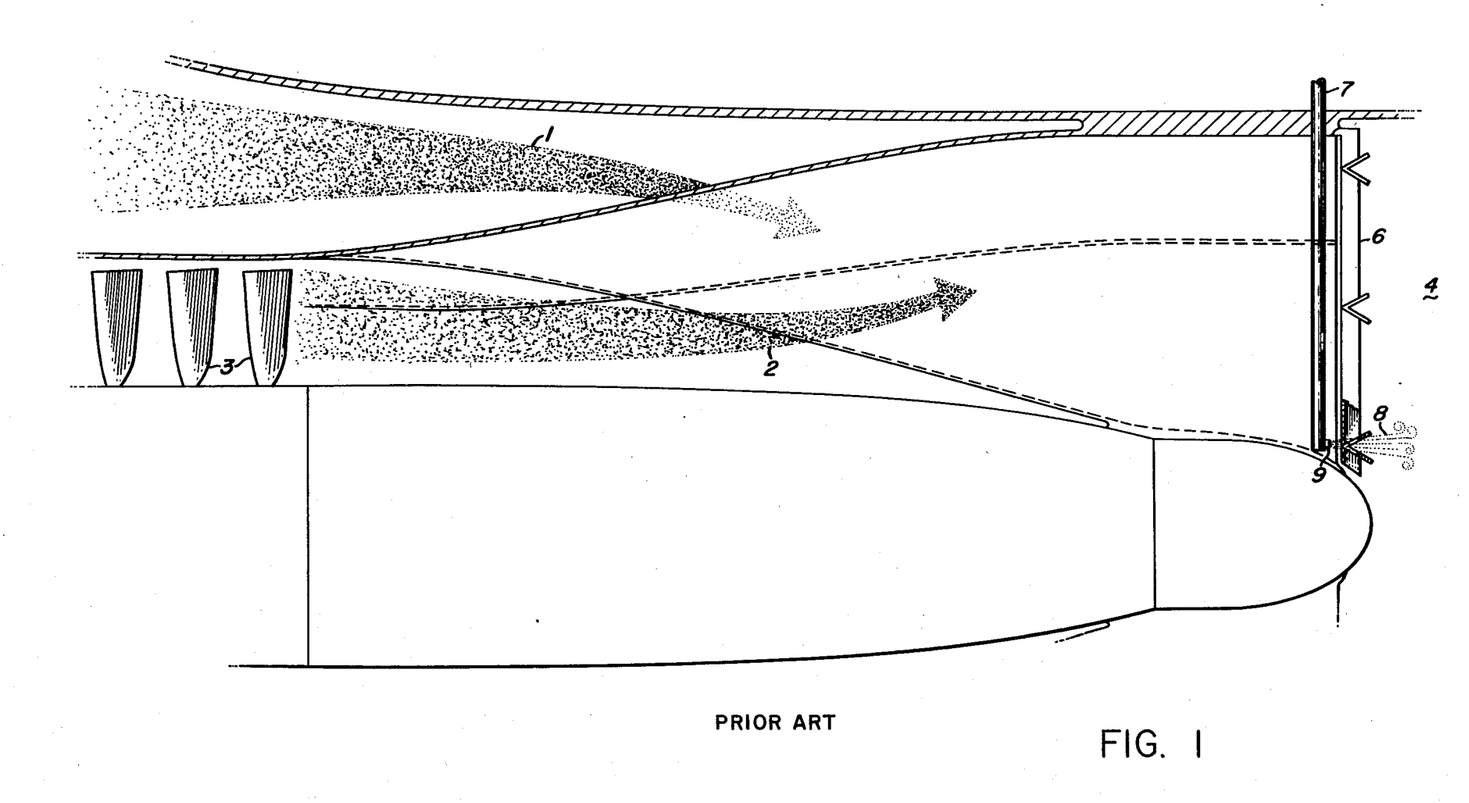
FIG. 1 contains a schematic afterburner configuration for a conventional turbofan jet engine.

Attention is now directed to the schematic drawing in FIG. 1, illustrating the aerodynamic flows in the region of the mixer and afterburner of a fairly conventional turbofan jet engine. Turbofan bypass air 1 and hot exhaust gases 2, leaving the final stages of turbine 3 are mixed in a region, 4, immediately downstream of flameholder assembly 6. Multiple, radially sectored mixer troughs interleave bypass air 1 and exhaust gases 2 prior to their entry into mixing region 4. A number of fuel spray bars, 7, are located in line with the exhaust gas troughs and in close proximity to flameholder assembly 6.

Fuel 8 is sprayed into the flow of hot exhaust gases 2 and onto "V" gutter type flameholder assembly 6, so that the fuel volume and proximity produces an enriched fuel-air mixture on a catalytic type ignitor mounted in the flameholder assembly. The rich mixture initiates light-off with minimal fuel, inherently generating a subdued pressure transient upstream within the jet engine structure.

Figure 2:
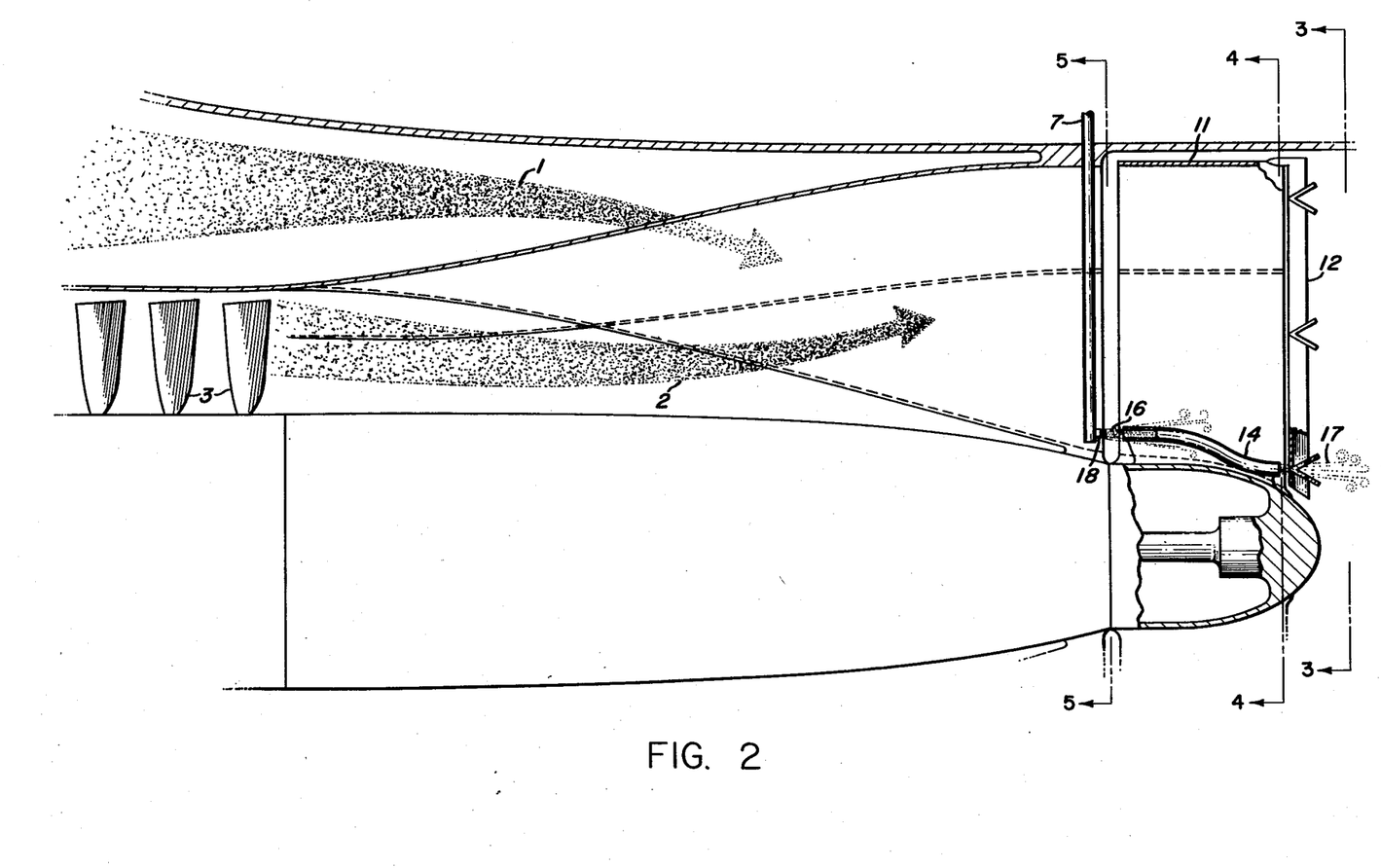
FIG. 2 schematically depicts an embodiment within a rotatable mixer engine configuration.
Figure 3:
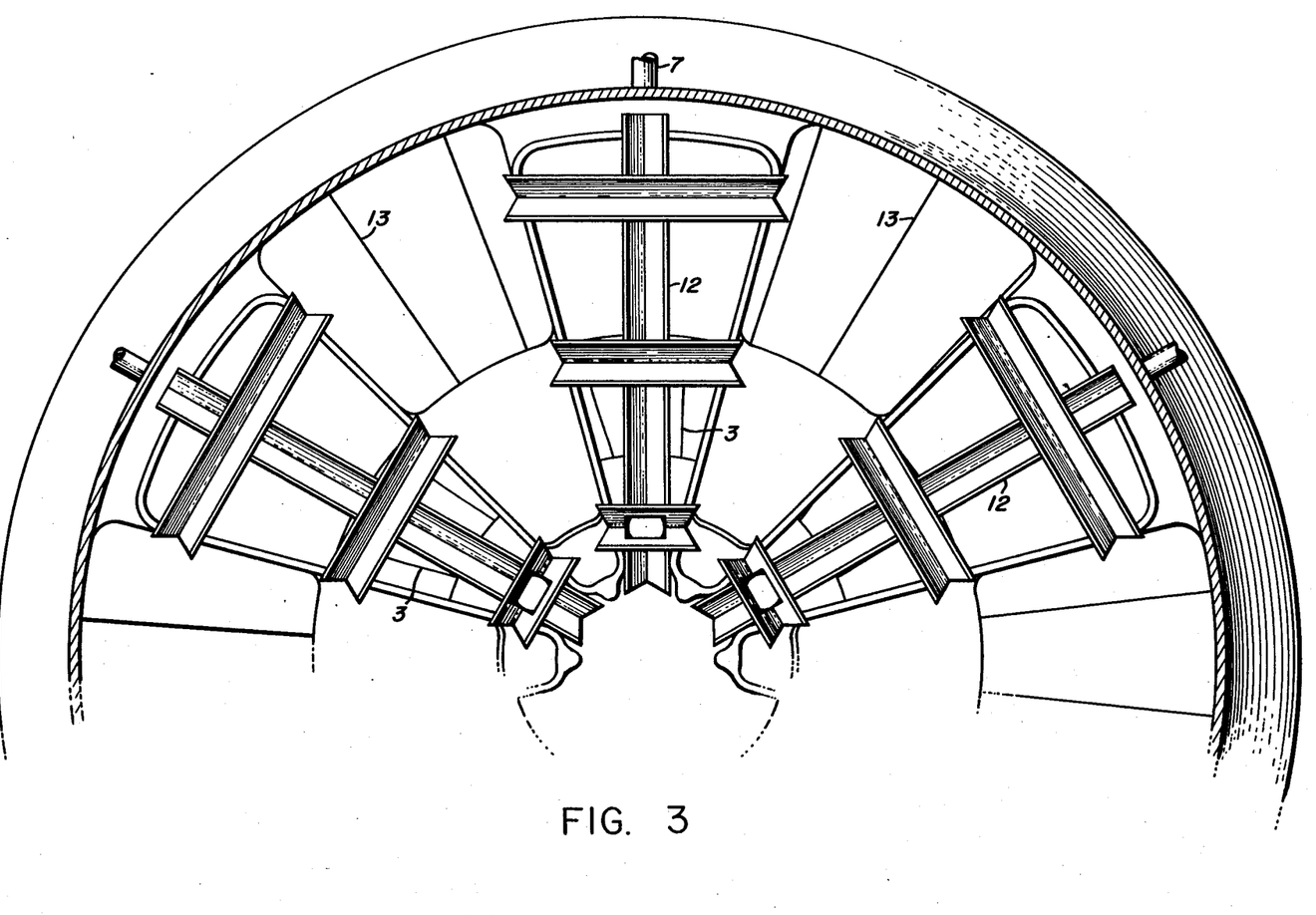
FIGS. 3, 4 and 5 are cross-sectional schematics of the engine depicted in FIG. 2.

FIG. 2 schematically depicts another turbofan jet engine, similar in overall configuration to the prior art of FIG. 1, excepting that downstream segment 11 of the mixer is rotatable about the engine axis by an angular displacement of at least one trough. Flameholder assembly 12 actually consists of multiple members fixed in alternate troughs. This configuration is clearly observable from the upstream view depicted schematically in FIG. 3. Rotation of mixer segment 11 thus translates flameholder assembly 12 between the path of hot exhaust gases 2 and cold bypass air 1. As shown in FIG. 3 the mixer is oriented in the afterburner mode, placing flameholder assembly 12 in the path of hot gases leaving turbine blades 3. Rotation of mixer segment 11 by one trough places the assembly into the direct path of cold bypass air off forward fan blade 13, reducing the assembly temperature and rearwardly directed infrared emission to a suppression operating level For purposes of clarity, the number of mixer troughs shown is significantly fewer than that utilized.

Though the switched mixer concept described above appropriately translates the flameholder assemblies to promote suppression, one undoubtedly notes the dilemma with respect to the location of afterburner fuel spray bars 7. Fundamental structural and aerodynamic flow constraints make it impracticable to locate flameholder assemblies 12 upstream of the position depicted in FIG. 2, e.g. at the upstream edge of rotatable mixer segment 11. If fuel spray bar 7 is attached to a fixed engine structure, as shown in FIG. 2, and fuel is introduced at a conventional and nominal rate, the dispersion while in transit through the turbulent gas flow in mixer segment 11 dilutes the fuel-air mixture reaching flameholder assembly 12 below the concentration necessary for reliable afterburner light-off. Increasing the fuel flow rate, temporarily or otherwise, satisfies the light-off concentration requirements. However, the elevated overall volume of fuel produces light-off temperature and pressure transients capable of inducing jet engine turbofan stall.

The alternate approach, attaching the fuel spray bars to rotatable mixer segment 11, is similarly unacceptable. In this configuration fuel to the spray bars would have to be transported through a flexible or otherwise movable joint between the stationary and rotatable elements. Such joints are not reliable in the severe environment present within this region of the engine.

The invention overcomes the noted problems with minimum effect on the overall turbojet engine design and reliability. Without increasing the overall fuel volume, the appropriate fuel-air mixture is conveyed between fuel spray bar 7, fixedly mounted to the engine structure, and flameholder assemblies 12 attached at the downstream end of rotatable mixer segment 11. As depicted in FIG. 2, fuel-air passage means in the form of conduits or transfer tubes 14 are attached within the troughs of mixer segment 11 in the region upstream of flameholder assemblies 12. Tubes 14 are aligned and oriented to capture some of fuel rich mixture 16, adjacent spray bar 7, and release the rich mixture, 17, onto ignitor mounted in the flameholder assembly.

The configurations schematically depicted in FIGS. 2, 3, 4 and 5 presume a single nozzle, 18, on spray bar 7, and a single fuel-air tube for each afterburner trough. Undoubtedly, the number and the locations of these elements are intimately related to the overall engine design.

Figure 4:
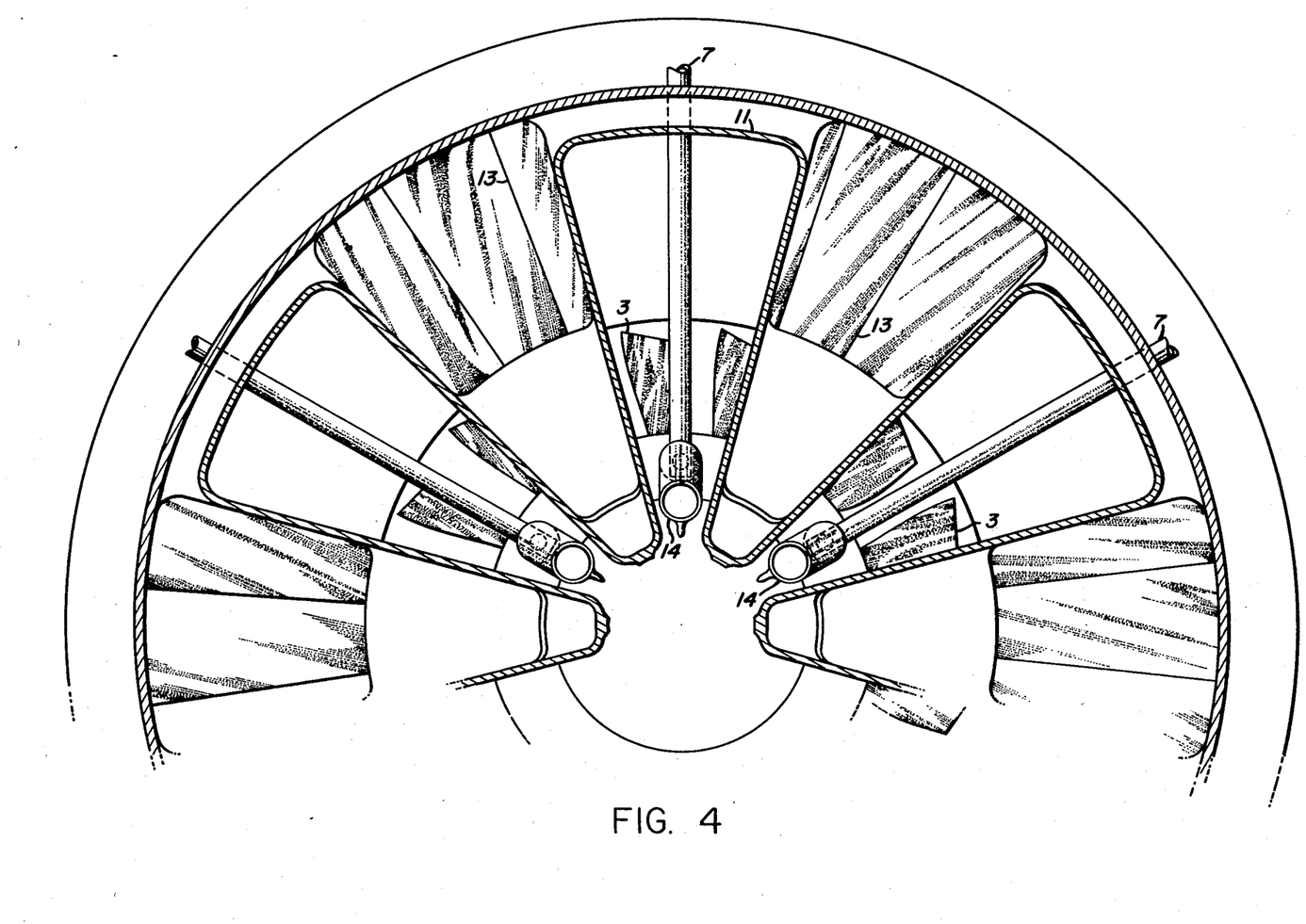
Figure 5:
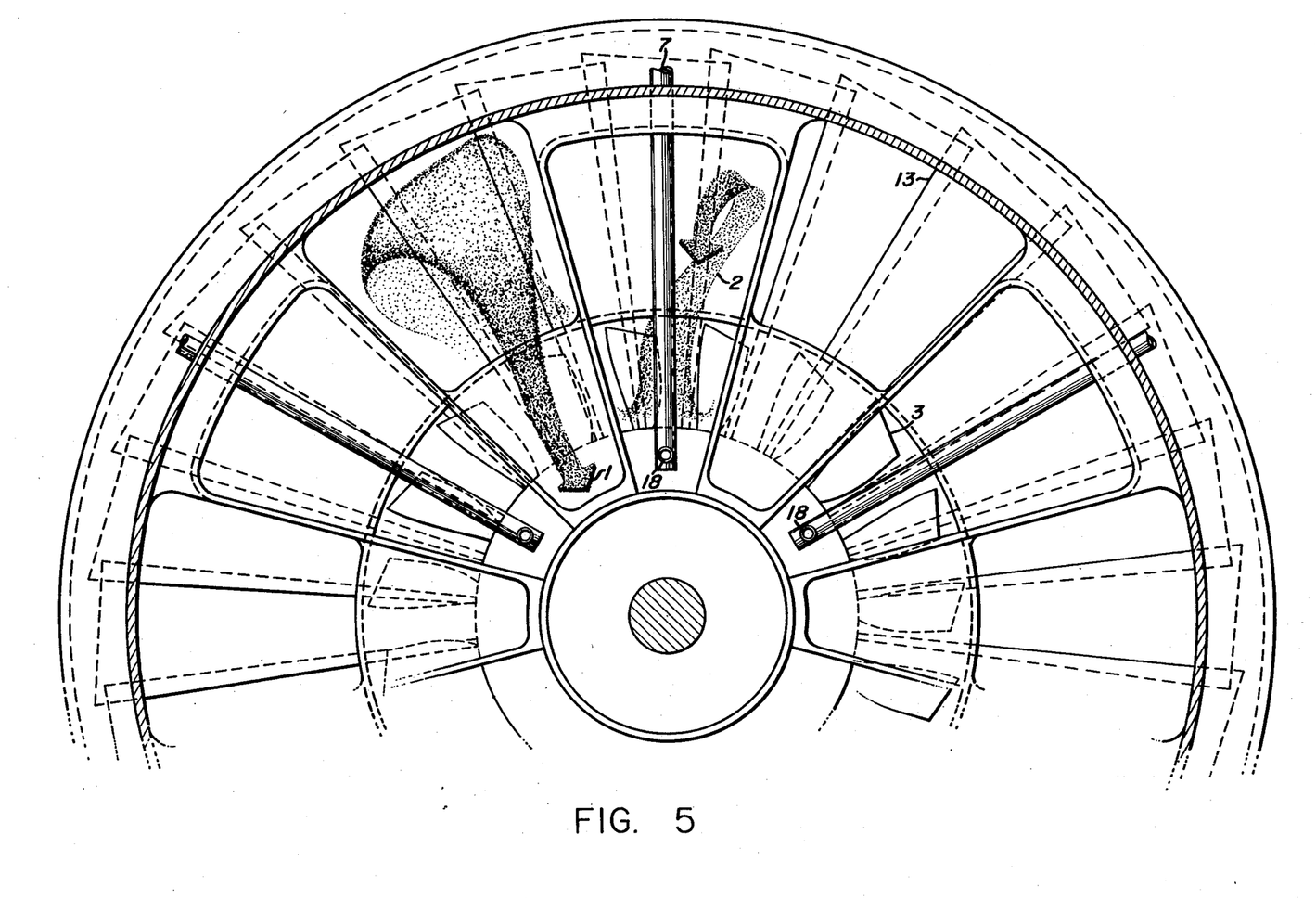

The cross-sectional views appearing in FIGS. 3, 4 and 5 show rotatable mixer segment 11 oriented to its afterburner mode of operation. The flameholder troughs of mixer segment 11 are visibly aligned with spray bars 7 and the hot exhaust gases 2 emanating from turbine blades 3. Cool bypass air 1 off fan blades 13 passes through adjacent troughs. To suppress the rearward infrared emissions, mixer segment 11 is rotated by an angular displacement of one trough, carrying with it flameholder assemblies 12 and fuel-air tubes 14. In this orientation hot exhaust gases 2 pass freely through an open trough in mixer segment 11 while flameholder assemblies 12 and fuel-air tubes 14 are subjected to an environment of cool bypass air.

Figure 6:
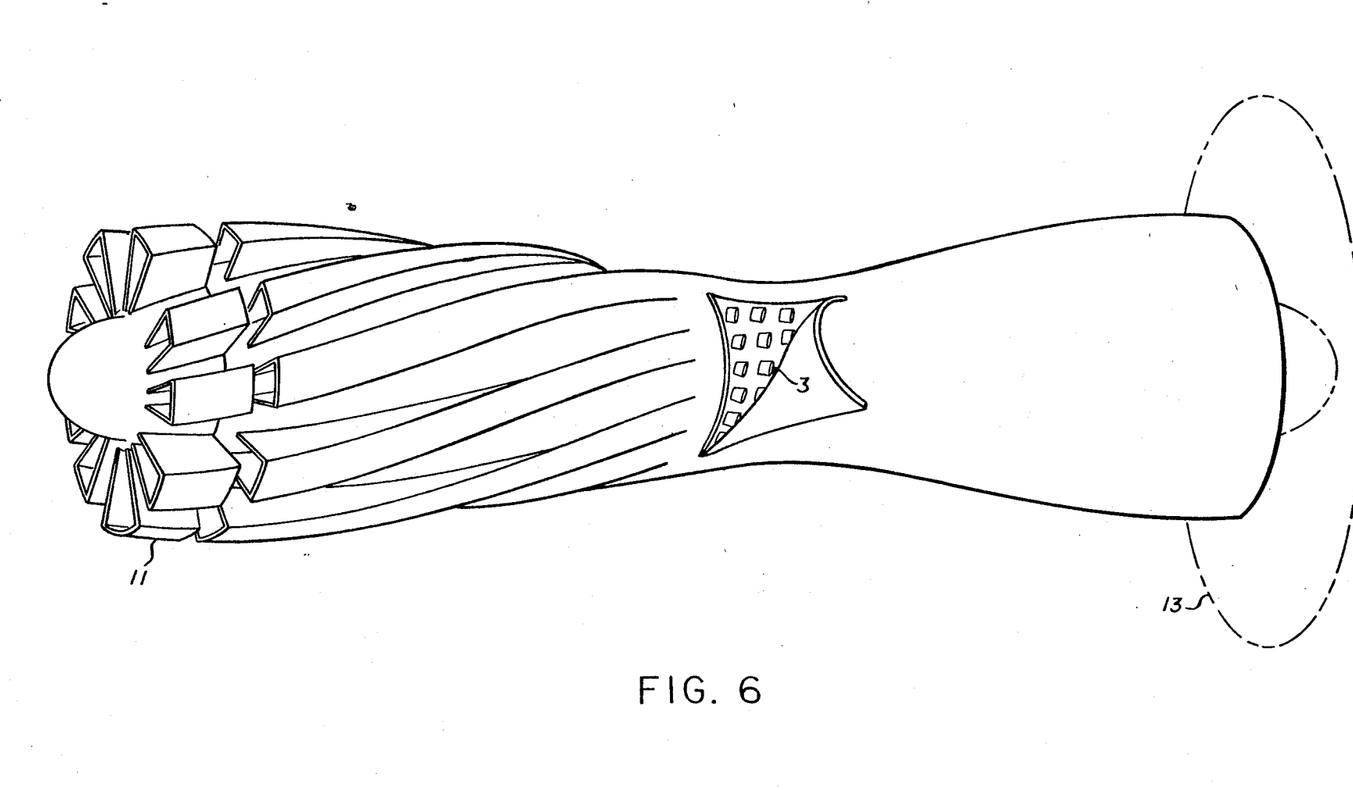
FIG. 6 is a schematic of the jet engine infrastructure, showing the curvilinear cant in the mixer troughs.

One undoubtedly notes that hot turbine blades 3 and heated fuel spray bars 7 radiate rearward without obstruction when mixer segment 11 is moved to the latter described suppression orientation. To avoid these sources of infrared emission the troughs in the engine mixer are actually canted with respect to the engine axis, in a manner analogous to that schematically depicted in FIG. 6. Recalling, from the foregoing, that the number of troughs is actually larger than that depicted, a curvilinear cant in the mixer allows the engine designer to locate the fuel spray bars so that they are not directly visible from the rear. The same is true of turbine blades 3. Reflecting back on FIGS. 3, 4 and 5, it is evident that a curvilinearly canted mixer with multiple small troughs would obscure spray bars 7 and blades 3 irrespective of mixer segment 11 orientation.

While the invention is shown and described with reference to a particular embodiment, those skilled in the art will recognize that variations in form and material may be made without departing from the scope or spirit of the invention.

We claim:

1. In a turbofan jet engine having a rotatable mixer in the gas stream of said engine for mixing fuel and air, said mixer comprising a radially sectored structure defining a plurality of axially extending troughs, a fuel source attached to the stationary structure of said engine upstream of said mixer, and an ignitor and flameholder downstream of said mixer, an improvement comprising: a transfer tube disposed in each alternate trough and rigidly attached to said mixer, each tube having an inlet near an upstream end of said mixer and an outlet near a downstream end of said mixer for capturing a fuel-rich fuel-air mixture from said source, transporting said mixture through said mixer and releasing said mixture at the downstream end of said mixer in the immediate vicinity of said ignitor and flameholder, the respective inlet of each said tube being aligned to capture substantially all the fuel released from said source at said respective inlet.

2. In a turbofan jet engine having a rotatable mixer in the gas stream of said engine for mixing fuel and air, said mixer comprising a radially sectored structure defining a plurality of axially extending troughs, a fuel source attached to the stationary structure of said engine upstream of said mixer, and an ignitor and flameholder downstream of said mixer, an improvement comprising: a transfer tube disposed in each alternate trough and rigidly attached to said mixer, each tube having an inlet near an upstream end of said mixer and an outlet near a downstream end of said mixer for capturing a fuel-rich fuel-air mixture from said source, transporting said mixture through said mixer and releasing said mixture at the downstream end of said mixer in the immediate vinicity of said ignitor and flameholder, the respective inlet of each said tube being aligned with said fuel source to capture substantially all the fuel released from said source at said respective inlet and the respective outlet of each said tube being aligned with said flameholder and ignitor to release the fuel-air mixture directly thereon.

* * * * *

UNITED STATES PATENT AND TRADEMARK OFFICE
CERTIFICATE OF CORRECTION

PATENT NO. : 4,686,826

DATED : August 18, 1987

INVENTOR(S) : John M. Koshoffer et al

It is certified that error appears in the above-identified patent and that said Letters Patent is hereby corrected as shown below:

Column 1, line 68, "prevente" should be ---prevented---.

Column 3, line 55, after "level" a period (.) should be inserted.

Column 6, line 14 (in claim 2), "vinicity" should be ---vicinity---.

Signed and Sealed this

Fifth Day of April, 1988

Attest:

*Attesting Officer*

DONALD J. QUIGG

*Commissioner of Patents and Trademarks*